(12) United States Patent
Hwang et al.

(10) Patent No.: US 11,330,312 B2
(45) Date of Patent: *May 10, 2022

(54) APPARATUS AND METHOD FOR CONFIGURING A CONTROL MESSAGE IN A BROADCAST SYSTEM

(71) Applicant: Samsung Electronics Co., Ltd., Suwon-si (KR)

(72) Inventors: Sung-Oh Hwang, Yongin-si (KR); Kyung-Mo Park, Seoul (KR); Sung-Ryeul Rhyu, Yongin-si (KR); Jae-Yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/944,472

(22) Filed: Jul. 31, 2020

(65) Prior Publication Data
US 2020/0366944 A1     Nov. 19, 2020

Related U.S. Application Data

(63) Continuation of application No. 16/510,249, filed on Jul. 12, 2019, now Pat. No. 10,771,826, which is a
(Continued)

(30) Foreign Application Priority Data

Jan. 19, 2011   (KR) .................. 10-2011-0005625
Oct. 13, 2011   (KR) .................. 10-2011-0104892

(51) Int. Cl.
*H04N 21/238*      (2011.01)
*H04N 21/6332*    (2011.01)
(Continued)

(52) U.S. Cl.
CPC ....... *H04N 21/238* (2013.01); *H04L 65/4076* (2013.01); *H04L 65/607* (2013.01);
(Continued)

(58) Field of Classification Search
CPC ............ H04N 21/238; H04N 21/2362; H04N 21/2381; H04N 21/6332; H04N 21/6405;
(Continued)

(56) References Cited

U.S. PATENT DOCUMENTS 6,252,907 B1   6/2001  Hwang
6,487,543 B1   11/2002 Ozaki et al.
(Continued)

FOREIGN PATENT DOCUMENTS

CN    1510846 A    7/2004
CN    1574955 A    2/2005
(Continued)

OTHER PUBLICATIONS

Ewald N L et al., "GSSTP: A signalling transport protocol for DVB-S2 GSE-only transmission systems", 2010 5th Advanced Satellite Multimedia Systems Conference and the 11th Signal Processing for Space Communication Workshop, Sep. 27, 2010.
(Continued)

*Primary Examiner* — James R Sheleheda
(74) *Attorney, Agent, or Firm* — Jefferson IP Law, LLP

(57) ABSTRACT

An apparatus and a method for providing information used for generating and consuming multimedia content in a broadcast system supporting a multimedia service based on an Internet protocol are provided. The method includes composing a message type field containing information indicating on a type of control information contained in the control message, composing a length field containing information on the length of the control message, composing optional fields having different values according to the type (Continued)

of the control information, and composing a payload field containing content of the control information.

12 Claims, 8 Drawing Sheets

Related U.S. Application Data continuation of application No. 13/980,443, filed as application No. PCT/KR2012/000505 on Jan. 19, 2012, now Pat. No. 10,356,453.

(51) Int. Cl.

| | | |
|---|---|---|
| H04N 21/2381 | (2011.01) | |
| H04N 21/2362 | (2011.01) | |
| H04L 29/06 | (2006.01) | |
| H04N 21/6405 | (2011.01) | |
| H04N 21/643 | (2011.01) | |
| H04L 12/18 | (2006.01) | |
| H04L 69/22 | (2022.01) | |
| H04L 65/611 | (2022.01) | |
| H04L 65/60 | (2022.01) | |
| H04L 65/65 | (2022.01) | |
| H04L 65/80 | (2022.01) | |

(52) U.S. Cl.
CPC .......... *H04L 65/608* (2013.01); *H04L 65/80* (2013.01); *H04L 69/22* (2013.01); *H04N 21/2362* (2013.01); *H04N 21/2381* (2013.01); *H04N 21/6332* (2013.01); *H04N 21/6405* (2013.01); *H04N 21/64322* (2013.01); *H04L 12/1836* (2013.01)

(58) Field of Classification Search
CPC .......... H04N 21/64322; H04L 65/4076; H04L 65/607; H04L 65/608; H04L 65/80; H04L 69/22; H04L 12/1836
See application file for complete search history.

(56) References Cited

U.S. PATENT DOCUMENTS

| | | | |
|---|---|---|---|
| 7,124,195 | B2 | 10/2006 | Roach et al. |
| 7,228,558 | B1 | 6/2007 | Lebouill |
| 7,793,320 | B2 | 9/2010 | Yun et al. |
| 7,853,708 | B2 | 12/2010 | Townsley et al. |
| 8,774,219 | B2 | 7/2014 | Bae |
| 9,407,946 | B2 | 8/2016 | Park et al. |
| 10,356,453 | B2 | 7/2019 | Hwang et al. |
| 10,771,826 | B2 * | 9/2020 | Hwang ............... H04N 21/2362 |
| 2002/0088007 | A1 | 7/2002 | Shimoji et al. |
| 2003/0035424 | A1 | 2/2003 | Abdollahi et al. |
| 2003/0147393 | A1 | 8/2003 | Stewart |
| 2004/0001592 | A1 | 1/2004 | Akiwumi-Assani et al. |
| 2004/0082343 | A1 | 4/2004 | Kim et al. |
| 2005/0043020 | A1 | 2/2005 | Lipsanen et al. |
| 2007/0040937 | A1 | 2/2007 | Eum |
| 2007/0042757 | A1 | 2/2007 | Jung et al. |
| 2007/0202886 | A1 | 8/2007 | Dhebri et al. |
| 2007/0203999 | A1 | 8/2007 | Townsley et al. |
| 2007/0268874 | A1 | 11/2007 | Vare et al. |
| 2008/0026692 | A1 | 1/2008 | Kojima |
| 2008/0134262 | A1 | 6/2008 | Jung et al. |
| 2008/0170531 | A1 | 7/2008 | Petry et al. |
| 2008/0189754 | A1 | 8/2008 | Yoon et al. |
| 2008/0232294 | A1 | 9/2008 | Ulupinar et al. |
| 2009/0010650 | A1 | 1/2009 | Tsuchiya et al. |
| 2009/0060030 | A1 | 3/2009 | Song et al. |
| 2009/0087164 | A1 | 4/2009 | Chikahisa et al. |
| 2009/0103651 | A1 | 4/2009 | Lahtonen et al. |
| 2009/0132721 | A1 | 5/2009 | Soroushian et al. |
| 2010/0162308 | A1 | 6/2010 | Suh et al. |
| 2011/0219138 | A1 | 9/2011 | Cho et al. |
| 2011/0255558 | A1 | 10/2011 | Hwang et al. |
| 2012/0011548 | A1 * | 1/2012 | Lahtonen ............ H04L 27/2659 725/62 |
| 2012/0297436 | A1 | 11/2012 | Eyer |
| 2013/0182609 | A1 | 7/2013 | Mo et al. |
| 2013/0305304 | A1 | 11/2013 | Hwang et al. |
| 2015/0156814 | A1 | 6/2015 | Yie et al. |
| 2015/0181296 | A1 | 6/2015 | Suh et al. |
| 2016/0192027 | A1 * | 6/2016 | Toma ............... H04N 21/42615 725/118 |
| 2016/0227288 | A1 | 8/2016 | Lee et al. |

FOREIGN PATENT DOCUMENTS

| | | |
|---|---|---|
| CN | 1666498 A | 9/2005 |
| CN | 1859580 A | 11/2006 |
| CN | 1921359 A | 2/2007 |
| CN | 1983947 A | 6/2007 |
| CN | 101022329 A | 8/2007 |
| CN | 101138243 A | 3/2008 |
| CN | 101243702 A | 8/2008 |
| CN | 101340734 A | 1/2009 |
| CN | 101641900 A | 2/2010 |
| EP | 1416687 B1 | 8/2006 |
| JP | 10-173612 A | 6/1998 |
| JP | 10-224766 A | 8/1998 |
| JP | H11-261986 A | 9/1999 |
| JP | 2002-305740 A | 10/2002 |
| JP | 2002-535926 A | 10/2002 |
| JP | 2005-027208 A | 1/2005 |
| JP | 2005-517328 A | 6/2005 |
| JP | 2007-509573 A | 4/2007 |
| JP | 2008-035248 A | 2/2008 |
| JP | 2008-085500 A | 4/2008 |
| JP | 2009-182751 A | 8/2009 |
| KR | 10-2008-0045276 A | 5/2008 |
| KR | 10-2009-0079672 A | 7/2009 |
| KR | 10-2010-0080330 A | 7/2010 |
| WO | 2009/084863 A2 | 7/2009 |

OTHER PUBLICATIONS

Counterpart Chinese Office Action dated Aug. 28, 2020, issued in Chinese Patent Application No. 201710929316.2.
Chinese Office Action dated Mar. 1, 2021, issued in Chinese Patent Application No. 201710929316.2.
Indian Office Action dated Nov. 16, 2018, issued in the Indian Application No. 6482/CHENP/2013.
Japanese Decision to Grant dated Nov. 13, 2018, issued in the Japanese Application No. 2018-048418.
Jaeyeon Song et al: MPEG Media Transport (MMT), 95. MPEG Meeting; Jan. 24, 2011-Jan. 28, 2011; Daegu; (Motion Picture Expert Group or ISO/IEC JTC1/SC29/WG11) No. m19266, Jan. 19, 2011 (Jan. 19, 2011), XP030047833.
European Search Report dated May 3, 2019, issued in European Application No. 19164628.0.
Doehla et al., On the Current Set of MMT Documents, International Organisation for Standardisation, Motion Picture Expert Group Meeting, Jul. 26, 2010, ISO/IEC JTC1/SC29/WG11, MPEG2010/M17836, Geneva, Switzerland.
ISO/IEC 14496-12, Third Edition, Information Technology—Coding of Audio-Visual Objects—Part 12: ISO Base Media File Format, 2008, i-x, 1-106, ISO/IEC 14496-12:2008(E), ISO, Switzerland.
Digital Video Broadcasting (DVB); Specification for Service Information (SI) in DVB Systems, Jul. 2008, pp. 1-111, ETSI EN 300 468 V1.8.1, European Telecommunications Standards Institute, Sophia Antipolis Cedex, France.
Full-Text Database of China's Excellent Master Dissertation, Apr. 15, 2009.
Chinese Office Action dated Dec. 26, 2019, issued in Chinese Patent Application No. 201709299316.2.

(56) References Cited

OTHER PUBLICATIONS

Chinese Office Action dated Feb. 27, 2020, issued in Chinese Patent Application No. 20170929317.7.
Internet Protocol Darpa Internet Program Protocol Specification, RFC: 791, Sep. 1981. (Year: 1981).
Interet Protocol, Version 6 (IPv6) Specification, RFC: 8200, Jul. 2017. (Year: 2017).
A Framework for Transmission of IP Datagrams over MPEG-2 Networks, RFC: 4259, Nov. 2005. (Year: 2005).

* cited by examiner

APPARATUS AND METHOD FOR CONFIGURING A CONTROL MESSAGE IN A BROADCAST SYSTEM

CROSS-REFERENCE TO RELATED APPLICATION(S)

This application is a continuation application of prior application Ser. No. 16/510,249, filed on Jul. 12, 2019, which application is a continuation application of prior application Ser. No. 13/980,443 filed on Jul. 18, 2013, which has issued as U.S. Pat. No. 10,356,453 on Jul. 16, 2019, which is the U.S. National Stage application under 35 U.S.C. § 371 of an International application filed on Jan. 19, 2012 and assigned application number PCT/KR2012/000505, which claimed the benefit of a Korean patent application filed on Jan. 19, 2011 in the Korean Intellectual Property Office and assigned Serial number 10-2011-0005625, and of a Korean patent application filed on Oct. 13, 2011 in the Korean Intellectual Property Office and assigned Serial number 10-2011-0104892, the entire disclosure of which is hereby incorporated by reference.

TECHNICAL FIELD

The present disclosure relates to an apparatus and method of configuring a control message in a broadcast system. More particularly, the present disclosure relates to an apparatus and a method of configuring a control message in a broadcast system that supports an Internet protocol-based multimedia service.

BACKGROUND

A broadcast network uses the Moving Picture Experts Group-2 Transport Stream (MPEG-2 TS) for delivering multimedia content according to the related art. The MPEG-2 TS is used as a representative transmission technique for delivering a bit stream in which a plurality of broadcast programs (a plurality of encoded video bit streams) can be transmitted without having an error. For example, the MPEG-2 TS is appropriate for digital TV broadcasting, or the like, in the multimedia era.

FIG. 1 illustrates a layer structure for supporting the MPEG-2 TS according to the related art.

Referring to FIG. 1, the layer for supporting the MPEG-2 TS includes a media coding layer 110, a sync layer 120, a delivery layer 130, a network layer 140, a data link layer 150, and a physical layer 160.

The media coding layer 110 and the sync layer 120 are formed of a format which is easily usable as a basic unit of recording or transmission of media data. Further, the delivery layer 130, the network layer 140, the data link layer 150, and the physical layer 160 record a data block (for example, "AU") configured by the sync layer 120 in a recording medium or configure a multimedia frame for transmission. The configured multimedia frame is delivered to a subscriber's terminal, or the like, through a predetermined network.

The sync layer 120 is composed of a fragment block 122 and an access unit 124, and the delivery layer 130 is composed of an MPEG-2 TS/MP4 132, an RTP/HTTP 134, and a UDP/TCP 136.

However, the MPEG-2 TS has several limits in supporting a multimedia service. That is, the MPEG-2 TS has the limitations of unidirectional communication, non-efficiency in transmission due to a fixed frame size, and a generation of an unnecessary overhead while delivering data by using a transmission protocol and an Internet Protocol (IP) specialized to an audio/video.

The MPEG newly suggests the MPEG Media Transport (MMT) standard as one of the multimedia transmission techniques for supporting the multimedia service based on the MPEG technique. The MMT standard is suggested by the MPEG in order to overcome the limits of the MPEG-2 TS.

The MMT standard may be applied in order to efficiently deliver hybrid contents through heterogeneous networks. Here, the hybrid contents refer to a set of contents having combined multimedia elements, such as a video/audio/application, or the like. The heterogeneous network means a network in which a broadcast network, a communication network, or the like, are mixed.

In addition, the MMT standard defines a transmission technique more friendly to the Internet Protocol (IP) which serves as a basic technique for transmitting the multimedia.

The MMT standard typically proves to be an efficient MPEG transmission technique in a multimedia service environment, varying based on the IP; continuous research and standardization thereof have progressed.

The MMT standard requires a preparation of a method of providing an efficient MPEG transmission technique in a recent multimedia service environment aiming to provide a hybrid network and hybrid contents.

Therefore, a need exists for a method and apparatus for configuring a control message to be used in a broadcast system that supports an IP-based multimedia service.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of providing control information for various types of multimedia contents in a broadcast system supporting an Internet Protocol-based multimedia service.

Another aspect of the present disclosure is to provide a method of providing control information for consuming a hybrid multimedia content in a broadcast system supporting an Internet Protocol-based multimedia service.

Another aspect of the present disclosure is to provide a method of providing information on a hybrid multimedia content in consideration of characteristics of heterogeneous networks in a broadcast system supporting an Internet Protocol-based multimedia service.

In accordance with an aspect of the present disclosure, a method of configuring a control message to provide information used for generating and consuming multimedia content in a broadcast system supporting a multimedia service based on an Internet protocol is provided. The method includes composing a message type field containing information on a type of control information contained in the control message, composing a length field containing information on a length of the control message, composing optional fields having different values according to the type of the control information and composing a payload field containing contents of the control information.

In accordance with another aspect of the present disclosure, an apparatus for configuring a control message to provide information used for generating and consuming multimedia content in a broadcast system supporting a multimedia service based on an Internet protocol is provided. The apparatus includes a multimedia controller configured to compose a message type field containing information on a type of control information contained in the control message, to compose a length field containing information on a length of the control message, to compose optional fields having different values according to the type of the control information, and to compose a payload field containing contents of the control information.

In embodiments of the present disclosure, it is possible to configure and provide a control message for consuming a hybrid service or a hybrid content, thereby achieving an effect of efficiently supporting an efficient Moving Picture Experts Group (MPEG) transmission in a multimedia environment.

In embodiments of the present disclosure, it is possible to provide a hybrid service or hybrid content through heterogeneous networks using control information, thereby achieving an effect of supporting an efficient MPEG transmission in a multimedia environment.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The Moving Pictures Media Transport (MMT) standard described herein will be described in terms of examples, but the present disclosure is not limited thereto, and may be applied to another broadcast technique.

Further, in embodiments of the present disclosure to be described below, a layer structure defined in the MMT standard will be described. Embodiments of the present disclosure to be described below suggest a configuration of a control information message for multimedia content. A layer for providing the control information message in the layer structure defined in the MMT standard will be described in detail.

Figure 1:
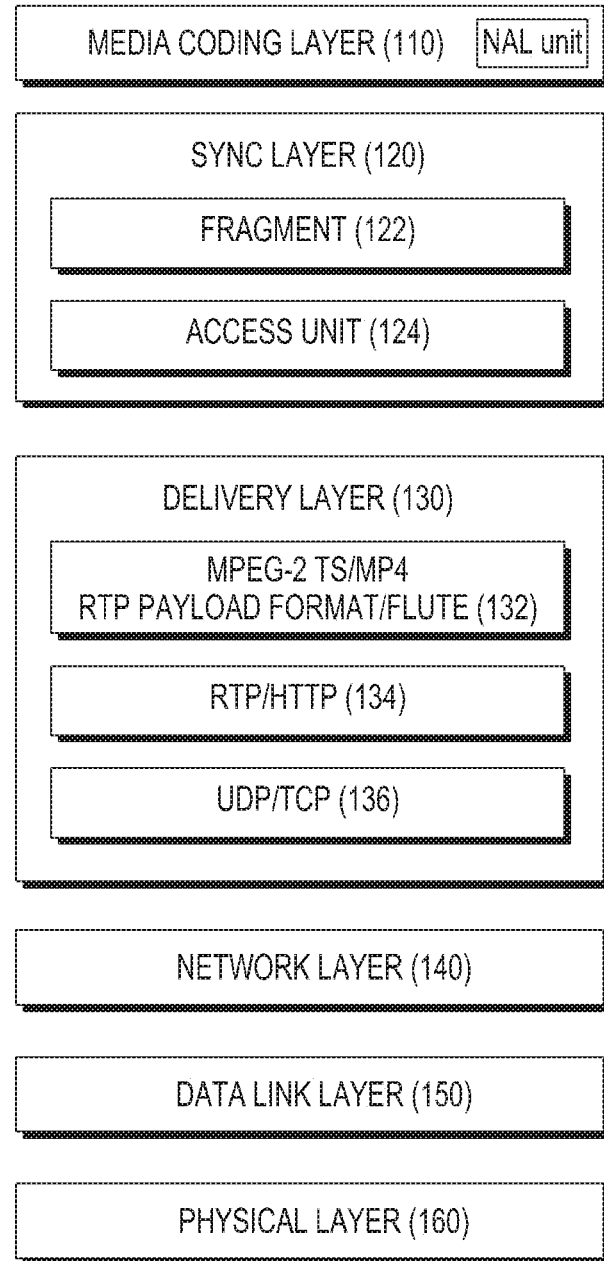
FIG. 1 is a diagram illustrating a layer structure for supporting the Moving Picture Experts Group-2 Transport Stream (MPEG-2 TS) according to the related art.
Figure 2:
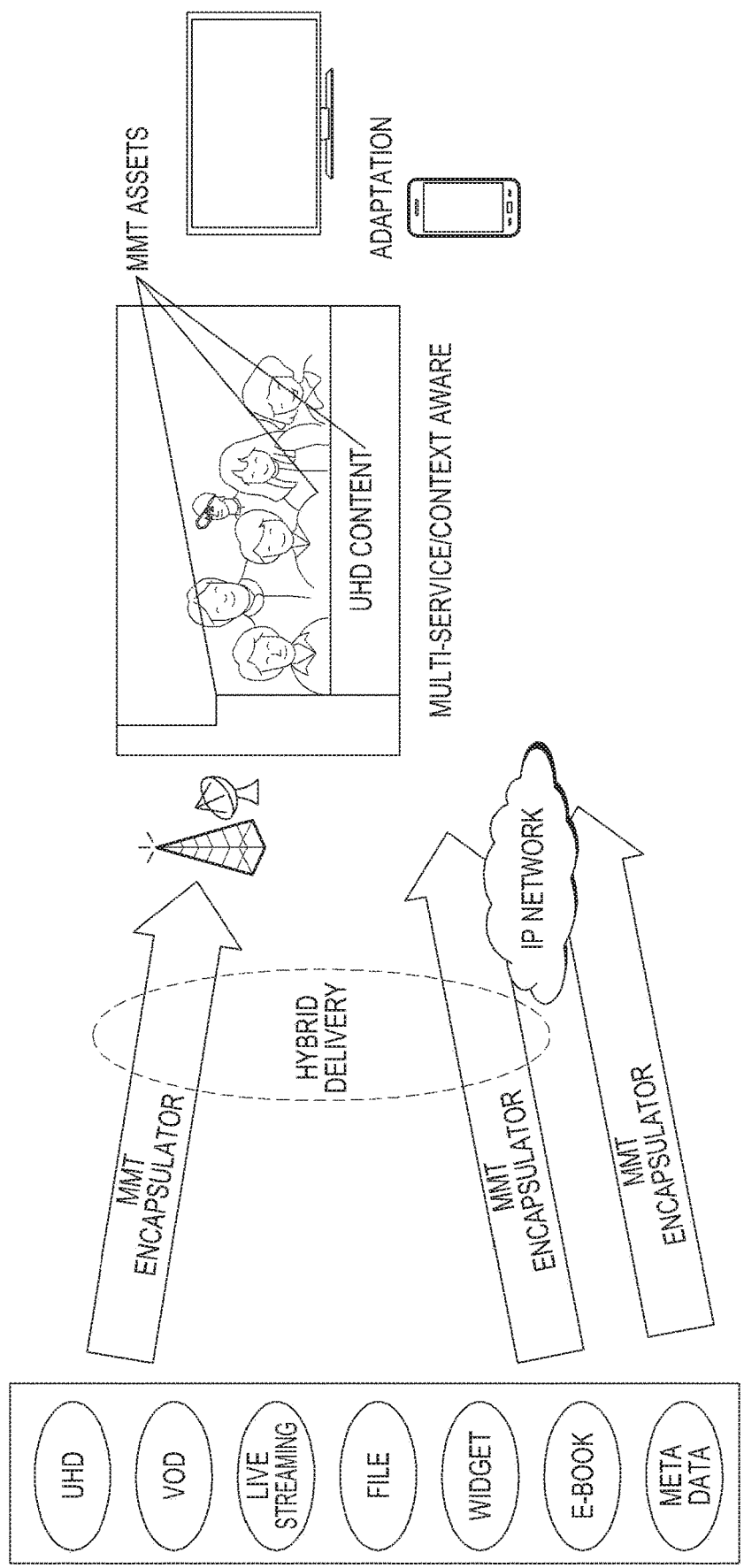
FIG. 2 is a diagram conceptually illustrating an MPEG Media Transport (MMT) service by a broadcast system based on the MMT standard for an application according to an embodiment of the present disclosure.

FIG. 2 is a diagram conceptually illustrating an MMT service by a broadcast system based on the MMT standard (hereinafter, referred to as an "MMT system") for an application according to an embodiment of the present disclosure.

Referring to FIG. 2, it is assumed that content for the MMT service includes Ultra High Definition (UHD), Video On Demand VOD, live streaming, a file, a widget, an E-book, metadata, or the like. However, the MMT service may target all of the contents expressible with an electrical signal as a matter of course.

Multimedia data according to each of the various contents may be encapsulated by a predetermined format by an MMT encapsulator and configured as a multimedia frame, to be delivered in a hybrid manner to a subscriber's terminal through heterogeneous networks. Here, the heterogeneous network means a network of a transmission environment in which a broadcast network and an Information Technology (IT) network are mixed.

The subscriber's terminal receiving the multimedia frame hybrid delivered through the heterogeneous networks extracts multimedia data corresponding to a desired content from the multimedia frame, and may provide a user with a combined video/audio/application based on the extracted multimedia data. In this case, each of the multimedia data corresponding to the video/audio/application provided for a specific content is defined as an "MMT asset". Further, the subscriber's terminal is meant to include most of the terminals capable of supporting a multimedia service. A representative example of the subscriber terminal may include an IP TV or a smart phone.

Accordingly, the MMT service provides high quality content delivery, hybrid content support, hybrid network support, or the like.

Figure 3:
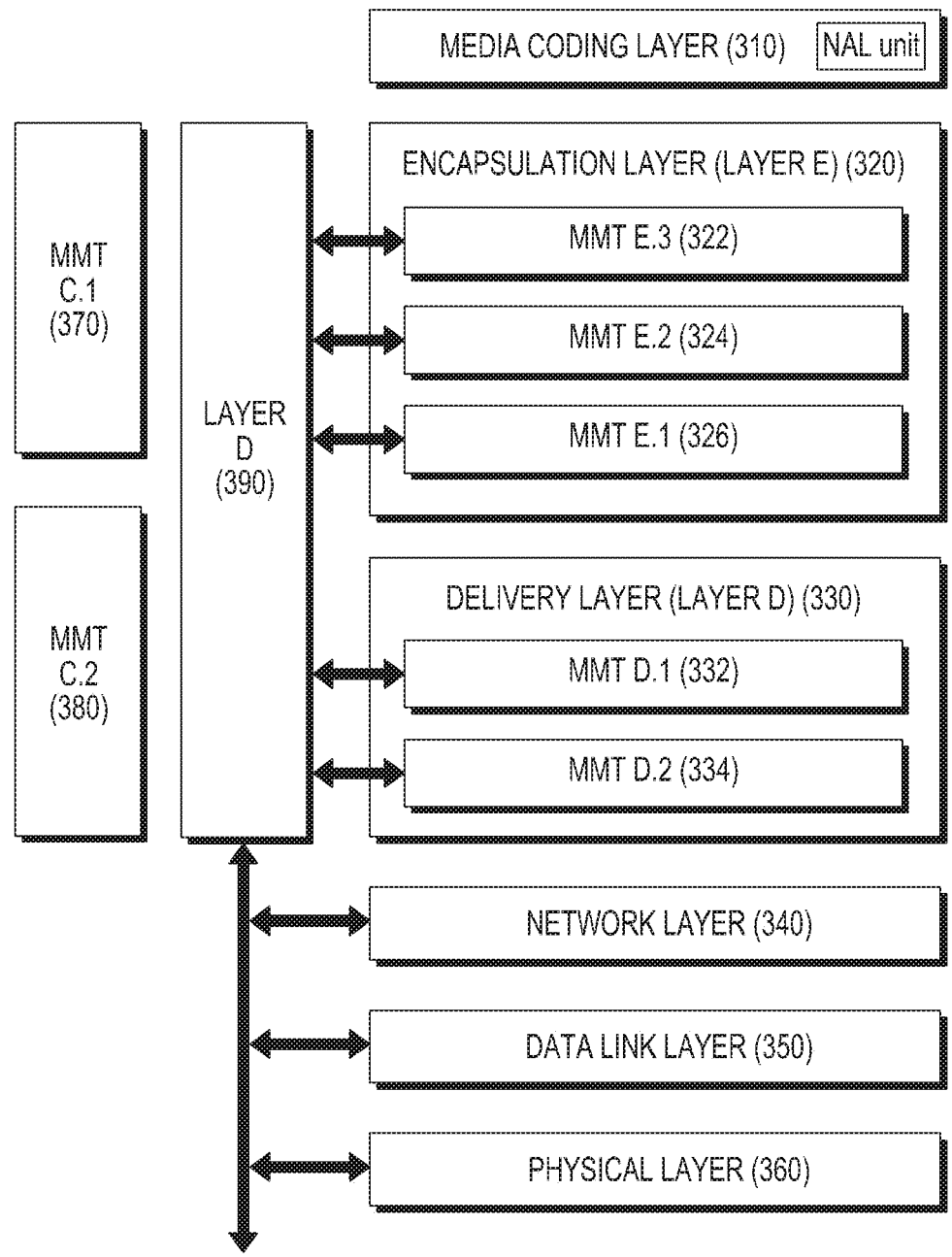
FIG. 3 is a diagram illustrating a layer structure for delivering a multimedia frame involving multi-services/content in the MMT system through heterogeneous networks according to an embodiment of the present disclosure.

FIG. 3 is a diagram illustrating a layer structure for delivering a multimedia frame involving multi-services/ contents in the MMT system through heterogeneous networks according to an embodiment of the present disclosure.

Referring to FIG. 3, the MMT system for composing the multimedia frame and delivering the multimedia frame includes a media coding layer 310, an encapsulation layer (hereinafter, referred to as "Layer E") 320, delivery layers (hereinafter, referred to as "Layer D") 330 and 390, a network layer 340, a data link layer 350, a physical layer 360, and control layers (hereinafter, referred to as "Layer C") 370 and 380.

According to an embodiment of the present disclosure, multimedia data involving multi-contents or multi-services is generated by the media coding layer 310 and the Layer E 320, so that the two layers may be considered as constituents of a "multimedia data generator". Further, the multimedia frame may include Layer D 330, so that the Layer D 330 may be considered as a constituent of a "multimedia frame composition unit". That is, the Layer D 330 corresponding to the multimedia frame composition unit configures header information with information on a frame identifier dividing the multimedia frame, and information demanded for measuring a connection service quality in the network layer and performance of the network between terminals, and combines the header information with the multimedia data to compose the multimedia frame. Further, information related to a generation, a consumption, and a transmission of the hybrid contents may be provided by the Layers C 370 and 380, so that the Layers C 370 and 380 may be considered as constituents of a "multimedia controller".

Further, as described above, the layers may include three description areas, the Layer E 320, the Layers D 330 and 390, and the Layers C 370 and 380. The Layer E 320 serves to generate hybrid contents, the Layers D 330 and 390 serve to efficiently deliver the generated contents through heterogeneous networks, and the Layers 370 and 380 serve to perform a general control for a management of consumption and delivery of the hybrid contents.

The Layer E 320 may include MMT E.3 322, MMT E.2 324, and MMT E.1 326. MMT E.3 322 generates a fragment which is the most basic unit for the MMT service with the coded multimedia data provided from the media coding layer 310 as an input. The MMT E.2 324 may generate an Access Unit (AU) for the MMT service by using the fragment generated by the MMT E.3 322. The MMT E.1 326 may generate a format for generating, storing, and delivering the hybrid contents by combining or dividing the AUs provided by the MMT E.2 324.

The Layer D includes MMT D.1 332, MMT D.2 334, and MMT D.3 390. The MMT D.1 332 serves as an Application Protocol (AP) performing a similar role to that of an RTP or an HTTP, the MMT D.2 334 serves as a network layer protocol performing a similar role to that of an UDP or a TCP, and the MMT D.3 390 performs an operation for an optimization between the respective layers configuring the Layer E 320 and the respective layers configuring the Layer D 330.

The Layer C includes MMT C.1 370 and MMT C.2 380. The MMT C.1 370 provides information related to the generation and the consumption of the hybrid contents, and the MMT C.2 380 provides information related to the delivery of the hybrid contents.

Next, a structure of the MMT C.1 of the Layer C to which the embodiment of the present disclosure is applied will be described in detail.

Figure 4:
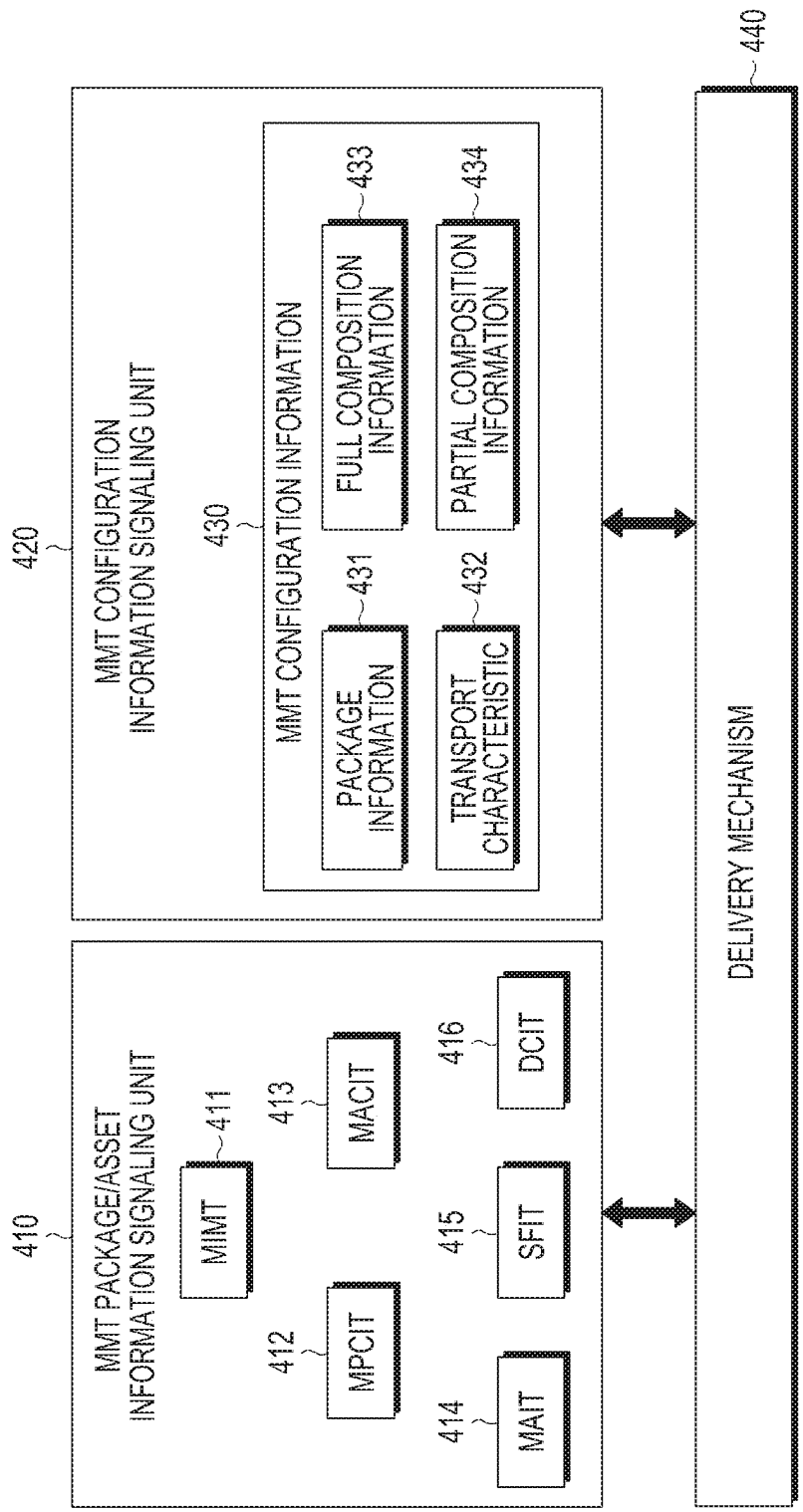
FIG. 4 is a diagram illustrating a structure of an MMT C.1 according to an embodiment of the present disclosure.

FIG. 4 is a diagram illustrating a structure of an MMT C.1 according to an embodiment of the present disclosure.

Referring to FIG. 4, the MMT C.1 provides information on hybrid multimedia contents and information used when the hybrid multimedia contents are consumed. In the MMT standard, the hybrid multimedia contents may be configured in a form of an MMT asset or an MMT package, and the MMT package may include a plurality of MMT assets.

Further referring to FIG. 4, the MMT C.1 includes an MMT package/asset information signaling unit 410 and an MMT configuration information signaling unit 420. The MMT package/asset information signaling unit 410 may include an MMT Package/Asset Information Management Table (MIMT) 411, an MMT Package Configuration Information Table (MPCIT) 412, an MMT Asset Configuration Information Table (MACIT) 413, an MMT Access Information Table (MAIT) 414, a Specific Function Information Table (SFIT) 415, and a Device Capability Information Table (DCIT) 416.

The MPCIT 412 contains information on an MMT asset, such as a content name, a content provider, a content form, and an application or a specification of hardware demanded for consuming content. The MACIT 413 contains information on an MMT package, such as package information, a package provider, and asset information configuring a package. The MAIT 414 includes information allowing access to the MMT asset or the MMT package. The SFIT 415 contains information about a system characteristic, such as device management or digital rights management. The DCIT 416 contains function information of a device recommended or demanded for the consumption of the MMT asset or the MMT package. The MIMT 411 contains table management information, such as version information and a renewal period for the five tables.

The MMT configuration information signaling unit 420 serves to deliver the MMT configuration information 430. The MMT configuration information may contain package information 431 on the MMT package, transport characteristics 432 which are information to be considered when the MMT package is transported, and composition information necessary when a package or an asset within the package, which is required when the MMT package or the asset within the MMT package is displayed on a screen of the device, is provided on the screen of the device. The transport characteristic 432 may contain information on a transport rate and an error rate, or a quality of experience. The composition information may contain full composition information providing all of the composition information within a consumption time when the MMT package or the MMT asset is consumed at once, and partial composition information 434 delivered with several pieces for various compositions within the consumption time. The partial composition information 434 may include various commands, such as play, stop, rewind, show up, or the like. Control information provided from the MMT package/asset information signaling unit 410 may be delivered through various delivery mechanisms 440.

FIGS. 5A to 5E are each a diagram illustrating a method of delivering an MMT C.1 message according to an embodiment of the present disclosure.

Figure 5A:
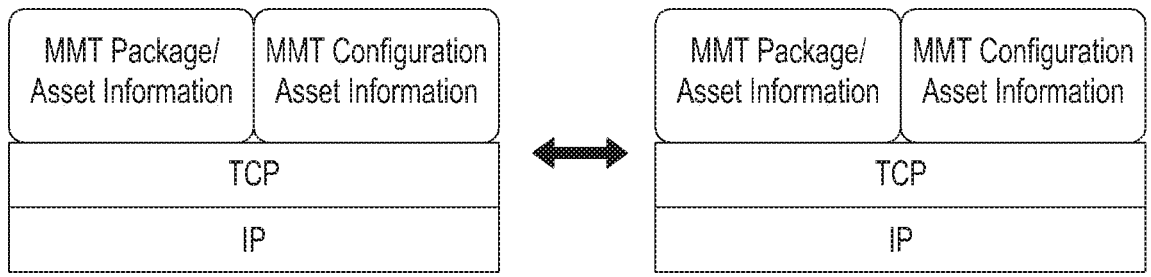
FIGS. 5A to 5E are each a diagram illustrating a method of delivering an MMT C.1 message according to an embodiment of the present disclosure.

Referring to FIG. 5A, the figure illustrates a delivery of the MMT package/asset information and MMT configuration information (hereinafter, referred to as a Layer C1 message), which are delivered by the MMT C.1 to a receiving party through the TCP/IP protocol. The mechanism of delivering the Layer C1 messages through the TCP/IP does not require a separate protocol, and is a delivery mechanism appropriate to a case where a server providing the MMT asset/package is directly connected with a client through the Internet according to an embodiment of the present disclosure.

Figure 5B:
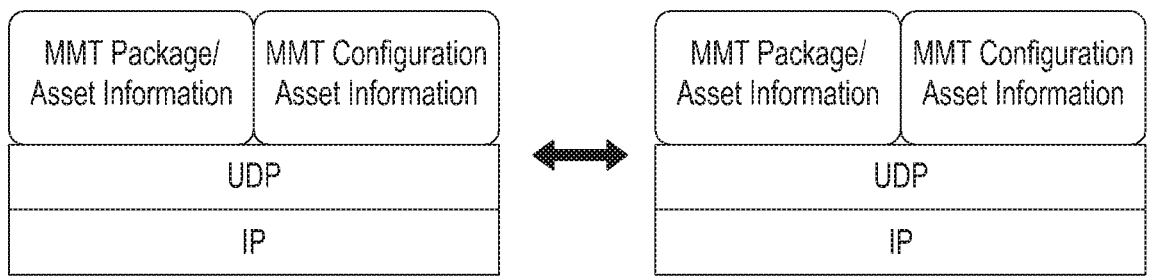

Referring to FIG. 5B, the figure illustrates a delivery of the Layer C1 message in an UDP/IP environment, and illustrates a mechanism appropriate to be used in an environment, in which it is difficult to use the TCP which is stable and has no error, but has many overheads, or an IP-based unidirectional delivery according to an embodiment of the present disclosure.

Figure 5C:
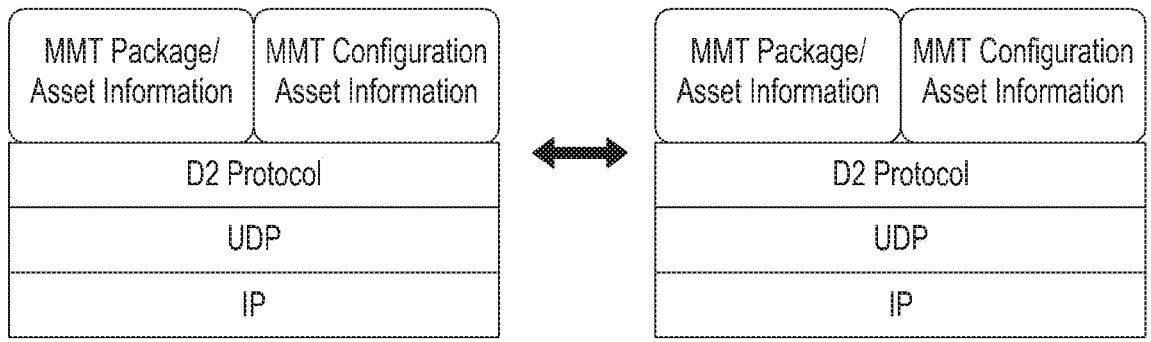

Referring to FIG. 5C, the figure illustrates a delivery of the Layer C1 message through a D2 protocol provided as a transport protocol in the MMT system. The Layer D is a layer serving the delivery, and includes a D1 payload layer and a D2 protocol layer. The D1 payload layer is a layer configuring a payload so as to deliver the MMT package/asset or the Layer C1 message regardless of various transport protocols, and the D2 protocol layer is a layer enabling the D1 payload to be appropriately delivered by providing an appropriate protocol considering the IP environment or the transmission environment. FIG. 5C illustrates a delivery of the Layer C1 message contained in a payload of a packet provided from the D2 protocol layer, and is a mechanism appropriate to a case where it is necessary to deliver the Layer C1 message through the same logic channel through which the multimedia content is delivered according to an embodiment of the present disclosure.

Figure 5D:
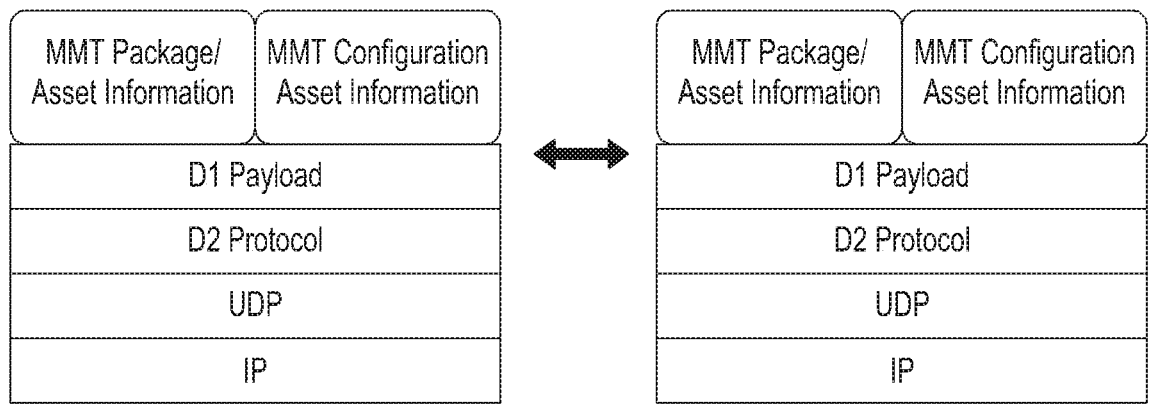

Referring to FIG. 5D, the figure illustrates a mechanism of delivering the Layer C1 message which is contained in the D1 payload, and is a mechanism appropriate when it is necessary to immediately consume the Layer C1 message, for example, a case when partial composition information on the MMT package/asset, or the like, is delivered according to an embodiment of the present disclosure.

Figure 5E:
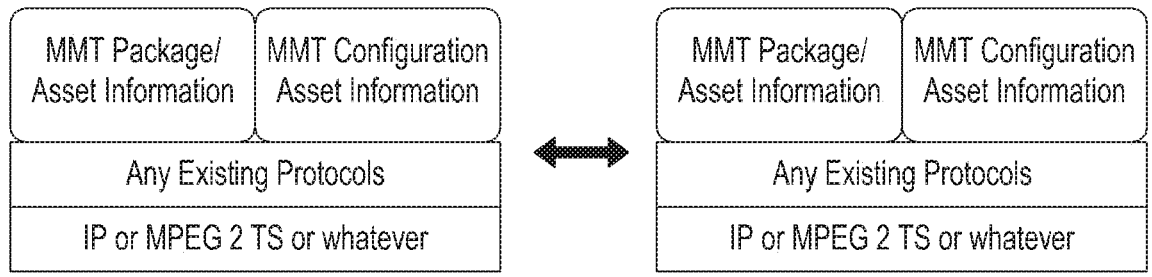

Referring to FIG. 5E, the figure illustrates an example in which the Layer C1 message may be delivered regardless of the IP environment or the broadcast environment, such as the MPEG-2 TS, and illustrates that the Layer C1 message may be contained in a protocol, such as an SDP, to be delivered according to an embodiment of the present disclosure.

Figure 6A:
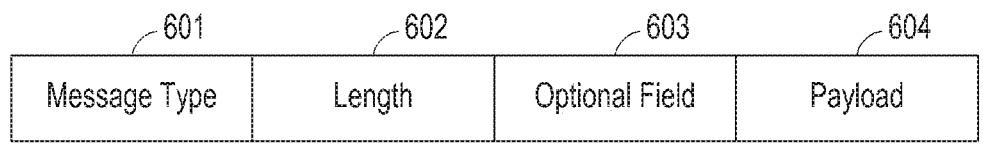
FIGS. 6A to 6E are each a diagram illustrating a configuration of a Layer C1 message according to an embodiment of the present disclosure.

FIGS. 6A to 6E are each a diagram illustrating a configuration of a Layer C1 message according to an embodiment of the present disclosure Referring to FIG. 6A, the figure illustrates a general structure of the Layer C1 message. A message type field 601 is a field through which whether contents delivered by the Layer C1 message is the MMT package/asset information, the MMT configuration information, the MMT full composition information, or the MMT partial composition information may be notified. About 2 bits are sufficient for a length of the message type field 601, but the length of the message type field 601 may be 1 byte considering an addition of the Layer C1 message, and the length of the message type is not limited in the present disclosure. A length field 602 is a field notifying of an entire length of the Layer C1 message, and may have a variable length according to a header of the Layer C1 message and a length of the payload. That is, the Layer C1 message having a short length may set to have a short length of the length field 602, and the Layer C1 message having a long length may set to have a long length of the length field 602. An optional field 603 is not a field optionally provided in the Layer C1 message, but a field providing other values which the Layer C1 message may have according to the type of message, which will be described in detail with reference to 6B to 6E. A payload field 604 is a field delivering actual contents of the Layer C1 message according to an embodiment of the present disclosure.

Figure 6B:
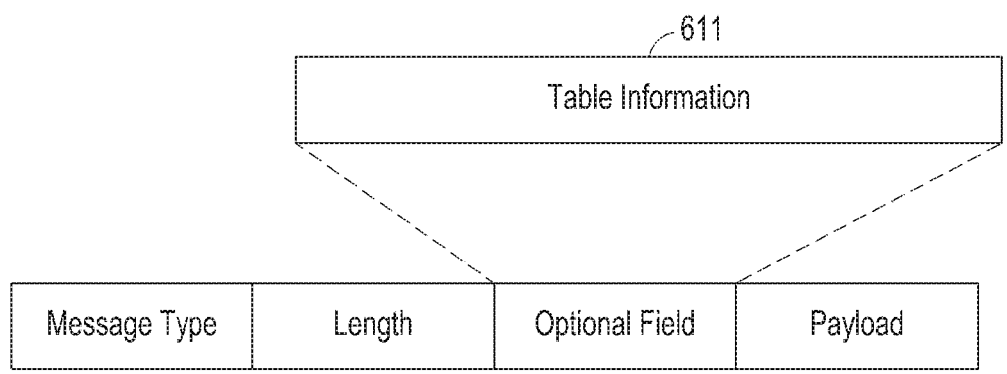

Referring to FIG. 6B, the figure illustrates a case in which the optional field includes table information 611 notifying of a type of table contained in the payload and delivered in a case where a message type of the Layer C1 message is the MMT package/asset information. For example, in a case where a table information field 611 is 6 bits, that is, a value of the table information field 611 is, e.g., 111000, it is notified that the MIMT, the MPCIT, and the MACIT are contained in the payload of the Layer C1 message and the MAIT, the SFIT, and the DCIT do not exist, so that a receiving unit may determine whether a necessary table is included in the payload in advance, thereby decreasing an unnecessary operation of the receiving unit. In the above description, existence or nonexistence of the table is only notified through the optional field through a binary expression, but a table identifier, version information, or the like, may be additionally delivered, and when the additional information is further contained, the length of the optional field is increased according to an embodiment of the present disclosure.

Figure 6C:
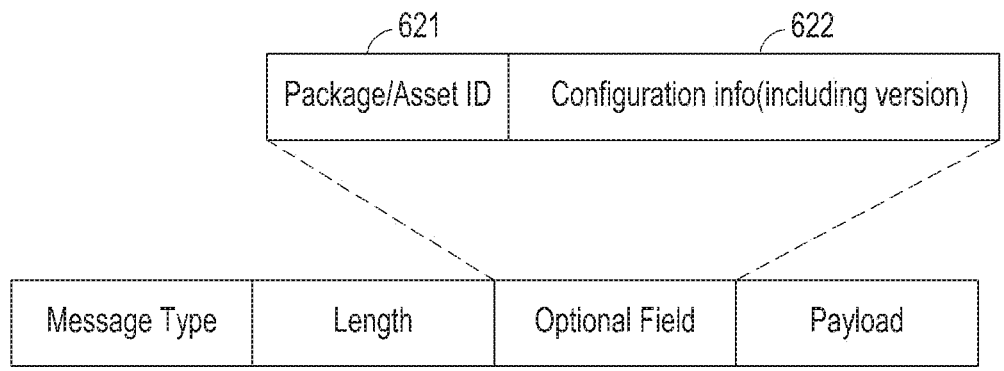

Referring to FIG. 6C, the figure illustrates a configuration of the optional field in a case where the message type of the Layer C1 message is the configuration information on the MMT package/asset. The configuration information is information connected with a specific MMT package/asset so that the configuration information essentially requires a package/asset ID 621, and may notify of configuration information 622 on the configuration information delivered by the payload, that is, a version thereof. When the Layer C1 message is delivered together with the MMT package or asset corresponding to the configuration information as illustrated in FIG. 6C or 6D, the package/asset ID may be omitted according to an embodiment of the present disclosure.

Figure 6D:
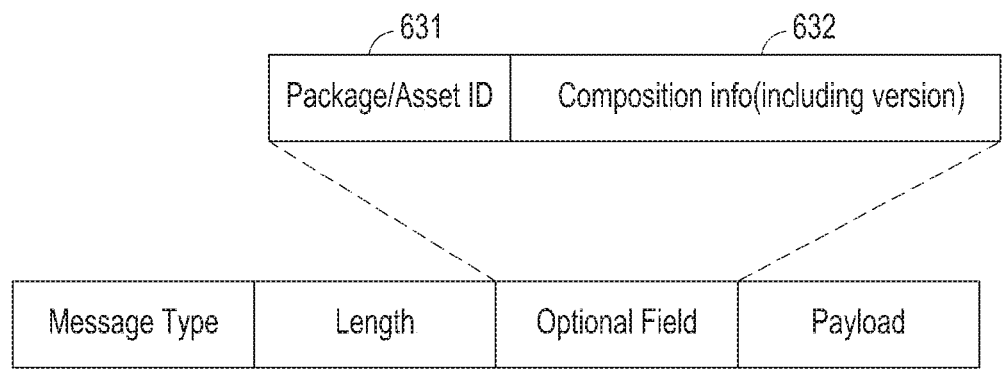

Referring to FIG. 6D, the figure illustrates a configuration of the optional field in a case where the message type of the Layer C1 message is the full composition information of the MMT package/asset. The composition information is information connected with a specific MMT package/asset, so that the composition information essentially requires a package/asset ID 631, and may notify of information 632 on the composition information delivered by the payload, that is, a version. When the Layer C1 message is delivered together with the MMT package or asset corresponding to the composition information, as illustrated in FIG. 6C or 6D, the package/asset ID may be omitted according to an embodiment of the present disclosure.

Figure 6E:
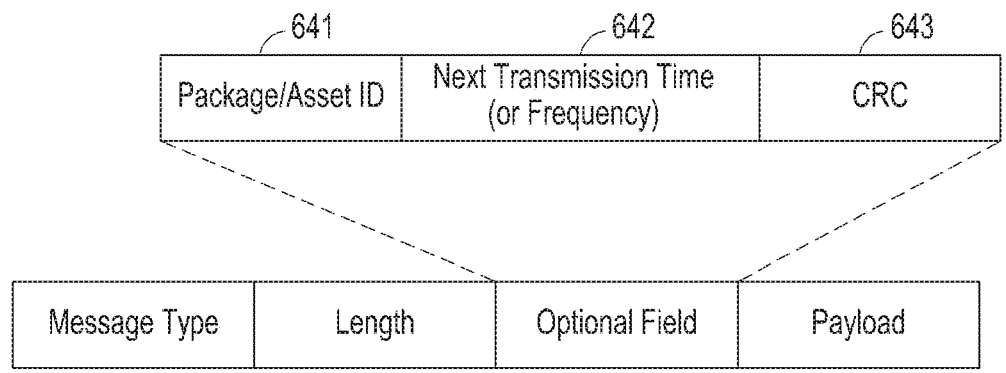

Referring to FIG. 6E, the figure illustrates a configuration of the optional field in a case where the message type of the Layer C1 message is the partial composition information of the MMT package/asset. The partial composition information is information connected with a specific MMT package/asset, so that the composition information may require a package/asset ID 641, but may be delivered together with the MMT package/asset according to a characteristic of the partial composition information, so that the package/asset ID 641 may be omitted. A next transmission time 642 notifies, in advance, of a time to receive partial composition information after currently received partial composition information, thereby enabling the receiving unit to perform an appropriate operation. Further, the next transmission time 642 may also notify of a transmission period of the partial composition information, not a specific time representing a next transmission time. Further, a command may be delivered according to the characteristic of the partial composition information, so that the optional field may include a CRC field 643 for checking validity of the command according to an embodiment of the present disclosure.

Various types of information may be contained in the payload of the partial composition information. The payload of the partial composition information may include a separate scene command of the MPEG Light Application Scene Representation (LASER) and the 3GPP Binary Format For Scenes (BIFS), which are scene composition technologies, commands (such as play, stop, replace, show up, appear, and disappear), may be directly defined and used, and a scene composition for a relatively short length having an XML or SMIL format may be contained in the payload of the partial composition information.

The contents of the payload of the full composition information may be expressed with SMIL, XML, and HTML, and may contain information usable for composing a content for a consumption time of the MMT package/asset.

The MMT configuration information includes contents defined in the Layer E performing a packing of the hybrid multimedia contents in the MMT system.

Next, a detailed configuration of the table related to the MMT package/asset information according to the embodiment of the present disclosure will be described in detail.

Table 1 illustrates the composition of the MIMT.

TABLE 1

| Name | Description | Data Type |
|---|---|---|
| MIMT | MMT Package/Asset Information Management Table | |
| id | Unique identifier MIMT | |
| version | Version of MIMT  The newer version overrides the older one as soon as it has been received. | |
| MIMT Transmission info | MIMT transmission information having StartTime or Retransmission Period | |
| StartTime | Starting Time of MIMT Transmission | |
| Retransmission Period | Retransmission time of MIMT Transmission | |
| Event Reception | Information for Event Reception  In case of delivery over Broadcast channel, IPBroadcastDelivery specifies the address information for receiving Event,  In case of delivery over Interaction channel, PollURL specify address information for polling event and 'PollPeriod' specifics the associated polling period.  Contains the following elements;  IPBroadcastDelivery  PollURL  PollPeriod | |
| IPBroadcastDelivery | Provides IP multicast address and port number for reception of Event over the broadcast channel.  Contains the following attributes:  port  address | |
| port | Event delivery UDP destination port number; delivery over Broadcast Channel | |
| address | Event delivery IP multicast address; delivery over Broadcast Channel | |
| PollURL | URL through which a client can poll Event over Interaction Channel. | |
| PollPeriod | While polling the events, the NTC is expected to poll every "PollPeriod" seconds. | |
| Information Table Info | Information table info has the version information of each Information table along with MIMT.  It have Information Table ID, version, transmission time, repetition period, Location and $2^{nd}$ location | 1 to N |
| Information table ID | Information table Identification | |
| Version | Version of Information Table | |
| Transmission Time | Transmission Time of IT | |
| Repetition Period | Repetition Period of IT | |
| Location | Address where a client gets IT | |
| $2^{nd}$ location | Alternative Address where a client gets IT | |
| TableFiltercode | Specifies the criteria for grouping Tables  If several criteria for grouping are present at the same time, all those grouping criteria apply to the set of Information tables.  GenreGroupingCriteria  Contains the following criteria:  Package ID,  Asset ID  Genre  Locations  Time  Terminal Capability | |

TABLE 1-continued

| Name | Description | Data Type |
| --- | --- | --- |
| | And so on | |
| | Note: The above list is not limited. | |
| PrivateExt | An element serving as a container for proprietary or application-specific extensions | |
| <proprietary elements> | Proprietary or application-specific elements that are not defined here | |

The MIMT provides information on information tables necessary for consuming the package/asset. A quantity of information necessary for consuming one or a small number of MMT packages may be small, but in a case where the plurality of MMT packages is provided through a broadcast network, the number of information tables providing the information necessary for consuming the MMT packages is increased. The MMT package is a transmission and storage object of the hybrid multimedia contents including various types of data, and may be, for example, music ranking contents including an application program through which voting is available. The MMT asset is a logic or physical object indicating a program, or the like, included in the MMT package, and in the music ranking contents package, each of a broadcast image, a broadcast audio, and the application program, through which voting is available, may be the MMT asset.

ID in Table 1, which is an identifier of the MIMT, may be a globally unique identifier, may be unique only within a range of a provider providing the MIMT, and may be unique only within a transmission network. As described above, a range of the validity of the MIMT may be determined according to the purpose of the use of the MIMT.

MIMT Transmission Info provides information necessary for delivering the MIMT, and has two sub elements of StartTime and Retransmission Period. StartTime provides an initial transmission time of the MIMT. Retransmission Period notifies of a period with an interval of the transmission of the MIMT from the initial transmission time indicated by StartTime, to notify of information on a time at which a user's terminal is scheduled to receive the MIMT.

Event Reception provides information through which an event through which a business operator providing the MIMT or a service provider may notify the user's terminal of specific or arbitrary information is receivable. The event may be delivered through a unidirectional channel, such as a terrestrial broadcast channel and a bidirectional channel, such as an Internet network, and thus the information, through which the event is receivable through the unidirectional channel and the bidirectional channel, may be provided. Even Reception includes IPBroadcastDelivery, PollURL, and PollPeriod as sub elements.

IPbroadcastDelivery provides event transmission information through the unidirectional channel, and has a port and an address as attributes. Address provides information on an IP address through which the event is delivered. The IP address may include a broadcast IP address, a multicast IP address, an IP address allocated by a service provider, or the like. Port provides information on a port address through which a datagram in which the event is delivered in an IP packet stream specified in the address is identifiable. The user's terminal may receive the event delivered through the unidirectional channel based on the information provided in Port and Address. PollURL and PollPeriod are information through which the event is received through the bidirectional channel PollURL provides address information, such as URL, through which a user's terminal can directly read the event, and Pollperiod notifies of a time at which the event is renewed to notify the user's terminal of a time at which the user's terminal is to receive a next event.

Information Table Info provides an identifier, a version, a transmission time, a repetition period, reception information, and second reception information for other information tables connected with the MIMT to provide information on the MMT package/asset. The user's terminal to consume the MMT package/asset may receive other information tables providing information necessary for the consumption of the MMT package/asset by using Information Table Info. Information Table Info contains information on one or more other information tables, and the information on the Information Table includes an identifier of IT provided through InformationTableID, version information on an information table provided through Version, a transmission time of the information table provided through Transmission Time, a repetition transmission period of the information table provided through Repetition Period, an address through which the information table is receivable, provided through Location, and another address, through which the information table is receivable, provided through the $2^{nd}$ location. The address may have different values according to an environment in which the information tables are delivered. For example, when the information tables are delivered through the MPEG-2 TS stream, the address may have a value provided for a channel reception in the TS system, when the information tables are delivered through the IP broadcast network, the address may have an IP address and a port number, and when the information tables are delivered through the mobile communication network, the address may be information necessary for the channel reception in the mobile communication network. In order to receive the information table through the information provided by the $2^{nd}$ location in a case where the information table cannot be received through the information provided by the Location (that is, in a case where information is obtained before the repetition period of the information table or it is impossible to directly access the transmission network through which the information is delivered), the Location and the $2^{nd}$ location are provided. For example, the Location provides information through which the information table is receivable through the broadcast channel, and $2^{nd}$ location provides an address of a server capable of providing the information table so that the information table may be received by an appropriate method if necessary.

TableFilterCode provides criteria based on which the information tables are selected according to predetermined criteria to be used. An example usable as the predetermined criteria, that is, Criteria, includes a package ID, an asset ID, a genre, locations of the user's terminal, a time, a terminal capability, or the like. When TableFilterCode of the MMT provides a specific MMT package ID, the user's terminal may select and receive only the information tables corresponding to the package ID, or use only the information tables corresponding to the package ID among the received information tables or display only the information tables corresponding to the package ID among the received information tables to the user in order to provide the MMT package information.

PrivateExt is an element used when a business operator, an MMT package producing company, or a producer producing the MIMT desires to provide predetermined information.

Table 2 represents the composition of the MPCIT.

TABLE 2

| Name | Description | Data Type |
|---|---|---|
| MPCIT | MMT Package Configuration information | |
| id | ID of MPCIT | |
| version | Version of MPCIT The newer version overrides the older one as soon as it has been received. | |
| MPCIT Transmission info | MPCIT transmission information having StartTime or Retransmission Period | |
| StartTime | Starting Time of MPCIT Transmission | |
| Retransmission Period | Retransmission time of MPCIT | |
| MMT Package ID | The globally unique identifier identifying MMT Package | |
| Package Type | Allowed values are: 0 - unspecified 1 - Basic Video 2 - Basic Audio 3 - Rich Media 4 - ebook 5 - application 6 - Hybrid Package 7 - 255 reserved for future use | |
| Name | Name of the package | |
| Description | Description, possibly in multiple languages | |
| AudioLanguage | Audio language used in Package | |
| TextLanguage | Textual language used in Package | |
| ParentalRating | The ParentalRating of package | |
| TargetUserProfile | Profile attributes of the users whom the package is targeting at | |
| Required Device Capability | Required device Capability for Package consumption | |
| List of Assets | List of Assets which belongs to a package It has Asset ID and MACIT info. | |
| Asset ID | ASSET ID | |
| MACIT INFO | Information of MACIT ID and Address | |
| PrivateExt | An element serving as a container for proprietary or application-specific extensions | |
| <proprietary elements> | Proprietary or application-specific elements that are not defined in here. | |

The MPCIT is a table providing composition information for the MMT package. The information provided in the MPCIT is information on the MPCIT itself and composition information on the MMT package. The information on the MPCIT itself may include an identifier (ID) of the MPCIT, a version of the MPCIT, and transmission information on the MACIT (MPCIT Transmission Info). The identifier of the MPCIT may be a globally unique identifier, and may be unique only within a range of a provider providing the MPCIT, or may be unique only within a transmission network. That is, a range of the validity of the MPCIT may be determined according to the purpose of the use of the MPCIT. MPCIT Transmission Info provides information necessary for delivering the MPCIT, and has two sub elements of StartTime and Retransmission Period. StartTime provides an initial transmission time of the MPCIT, and Retransmission period notifies of a period with an interval of the transmission of the MPCIT from the initial transmission time indicated by StartTime to notify of information on a time at which a device is scheduled to receive the MPCIT. The composition information on the MMT package includes an identifier, a type, a name, a description, voice information and text information of the package, viewer protection, target user information, information on requirements of a terminal necessary for consuming the MMT package, and information on assets composing the MMT package.

MMT Package ID is an identifier of the MMT package of which the composition information is provided by the MPCIT. MMP Package ID may be allocated by a producer of the MMT package, or may also be allocated by a service provider using the MMT package. Further, a range of validity of MMT Package ID may be globally unique, and may be unique for each region or each service provider. In the present disclosure, a system for allocating an identifier is not specifically suggested, but an identifier using a random method capable of identifying the MMT package may also be provided through MMP Package ID.

PackageType notifies of the type of package from a point of view of a content or a service. In order to assist in understanding of the disclosure, the embodiment of the present disclosure suggests seven types of package, 0—unspecified, 1—Basic Video, 2—Basic Audio, 3—Rich Media, 4—ebook, 5—application, 6—Hybrid Package, and suggests the type of package so as to regulate an additional 249 types of packages. However, the type of packages may be added according to a method of discriminating the MMT package by a producer of the MMT package or a service provider using the MMT package. Further, if 256 types of packages are insufficient, the number of identifiers of the type of packages may be increased. Name is a name of the MMT package through which the user may identify the MMT package. Description is a field providing the user with information on the MMT package, and provides information on a genre, summary, a provider, or the like, of the MMT package, and may be provided with several languages. AudioLanguage and TextLanguage provide information on an audio language and a text language used in the MMT package, and several languages may be used therefor. ParentalRating suggests an age of a user appropriate to consume the MMT package, and is used for providing information for preventing users of an age group which are not suitable to consume the MMT package from consuming the MMT package. TargetUserProfile provides a profile of a user expected to prefer a random MMT package, and may be, for example, an adolescent generation or people living in a specific place. Required Device Capability is a specification of a user's terminal recommended in consuming the MMT package indicated by the MPCIT, and may include a codec, a memory, a CPU speed, and a device screen size. List of Assets provides information on the asset composing the MMT package indicated by the MPCIT. List of Assets has sub elements of Asset ID and MACIT Info. Asset ID is identifiers of the assets composing the MMT package. MACIT INFO is information on the MACIT corresponding to the assets. The MACIT will be described in detail in Table 3. Information provided in MACIT INFO may be an MACIT identifier and MACIT transmission information.

PrivateExt and <Proprietary Elements> are elements used when a business operator, an MMT package producing company, or a producer producing the MPCIT desires to provide predetermined information.

Table 3 represents the composition of the MACIT.

TABLE 3

| Name | Description | Data Type |
|---|---|---|
| MACIT | MMT Asset Configuration information | |
| id | ID of MACIT | |
| version | Version of MACIT | |
| | The newer version overrides the older one as soon as it has been received. | |
| MACIT Transmission info | MACIT transmission information having StartTime or Retransmission Period | |
| StartTime | Starting Time of MACIT Transmission | |
| Retransmission Period | Retransmission time of MACIT | |
| MMT Asset ID | The globally unique identifier identifying MMT Asset | |
| Asset Type | Allowed values are: 0 - unspecified 1 - Basic Video 2 - Basic Audio 3 - Rich Media 4 - ebook 5 - application 6- text 7- HTML 8 - 255 reserved for future use | |
| Name | Name of the asset | |
| Description | Description, possibly in multiple languages | |
| AudioLanguage | Audio language used in asset | |
| TextLanguage | Textual language used in asset | |
| ParentalRating | The ParentalRating of assete | |
| TargetUserProfile | Profile attributes of the users whom the asset is targeting at | |
| Required Device Capability | Required device Capability for asset consumption | |
| List of component | List of component which belongs to an Asset It has Asset ID and MACIT info. | |
| Component INFO | Information of component in asset | |
| PrivateExt | An element serving as a container for proprietary or application-specific extensions | |
| <proprietary elements> | Proprietary or application-specific elements that are not defined in here | |

The MACIT is a table providing the composition information on the MMT asset. The information provided in the MACIT is information on the MACIT itself and composition information on the MMT asset. The information on the MACIT itself is an identifier (ID) of the MACIT, a version of the MACIT, and transmission information on the MACIT (MACIT Transmission Info). The identifier of the MACIT is an identifier of the MACIT and may be a globally unique identifier, may be unique only within a range of a provider providing the MACIT, or may be unique only within a transmission network. That is, a range of the validity of the MACIT may be determined according to the purpose of the use of the MACIT. MACIT Transmission Info provides information necessary for delivering the MACIT, and has two sub elements of StartTime and Retransmission. StartTime provides an initial transmission time of the MACIT. Retransmission period notifies of a period with an interval of the transmission of the MACIT from the initial transmission time indicated by StartTime to notify of information on a time at which a device is scheduled to receive the MACIT.

The composition information on the MMT asset includes an identifier, a type, a name, a description, voice information, and text information of the asset, viewer protection, target user information, information on requirements of a terminal necessary for consuming the MMT asset, and information on components composing the MMT asset. The MMT asset may include a single multimedia component, and may include a plurality of multimedia components. An example of the asset including the single multimedia component includes a video asset, an audio asset, a text asset, a figure asset. An example of the asset including the plurality of multimedia components includes a basic image (basic layer) and an additional image (enhanced layer) of video contents generated by Scalable Video Coding (SVC), a plurality of audio sets including several languages, and one page, such as a web page, including several multimedia sources, or the like.

MMT AssetID is an identifier of the MMT asset of which the composition information is provided by the MACIT. MMP AssetID may be allocated by a producer of the asset, or may also be allocated by a service provider using the asset. Further, a range of validity of MMT AssetID may be globally unique, and may be unique for each region or each service provider. In the present disclosure, a system for allocating an identifier is not specifically suggested, but an identifier using a random method capable of identifying the MMT asset may also be provided through MMP AssetID.

AssetType notifies of the type of asset from a point of view of a content, a service, or a package. In order to help understanding, the embodiment of the present disclosure suggests eight types of asset, 0—unspecified, 1—Basic Video, 2—Basic Audio, 3—Rich Media, 4—ebook, 5—application, 6—text, 7—HTML, and suggests the type of package so as to regulate additional 248 types of assets. However, the type of asset may be added according to a method of discriminating the asset by a producer of the asset or a service provider using the asset. Further, if 256 types of assets are insufficient, the number of identifiers of the types of assets may be increased. Name is a name of the asset within the MMT package through which the user may identify the MMT asset. Description is a field providing the user with information on the asset, and provides information on a format, a genre, summary, a provider, or the like, of the asset, and may be provided with several languages. AudioLanguage and TextLanguage provide information on an audio language and a text language used in the asset, and several languages may be used therefor. ParentalRating suggests an age of a user appropriate to consume the asset, and is used for providing information for preventing users of an age group, which are not suitable to consume the asset, from consuming the corresponding asset. TargetUserProfile provides a profile of a user expected to prefer a random MMT asset, and may be, for example, an adolescent generation or people living in a specific place. Required Device Capability is a specification of a device recommended in consuming the MMT asset indicated by the MACIT, and may include a codec, a memory, a CPU speed, and a device screen size. List of Assets provides information on multimedia components composing the MMT asset indicated by the MPCIT. Component Info is a field providing substantial information on the multimedia components, and may include a name, a form, and a type of the component, information necessary at a component level which is a specification necessary for reproducing the component, or the like. PrivateExt and <Proprietary Elements> are elements used when a business operator, an MMT asset producing company, or a producer producing the MACIT desires to provide predetermined information.

Table 4 represents the composition of the MAIT.

TABLE 4

| Name | Description | Data Type |
| --- | --- | --- |
| MAIT | MMT Access Information Table | |
| id | ID of MAIT | |
| version | Version of MAIT | |
| MAIT Transmission info | MAIT transmission information having StartTime or Retransmission Period | |
| StartTime | Starting Time of MAIT Transmission | |
| Retransmission Period | Retransmission time of MAIT | |
| List of Packages or Assets | List of Packages or Assets that a client can access through the information of MAIT | |
| AccessType | Defines the type of access. Contains the following elements: BroadcastDelivery UnicastDelivery HybridDelivery | |
| BroadcastDelivery | It is used for the indication of Broadcast Network. It contains Network Type and SessionDescription | |
| NetworkType | Type of network It has the following information: Type Version | |
| Type | Type of network, possible values: 0 - Broadcasting network such as DVB-T, ISDT-T, ATX 1- Mobile Broadcast network such as DVB NGH, DMB, and so on 2 -255 reserved for future use | |
| Version | Version of network | |
| SessionDescription | Information about Session Description for Broadcast Network | |
| UnicastDelivery | It is used for the indication of Unicast Network It has the information of Network type, AccessURL and SessionDescription | |
| type | Specifies transport mechanism that is used for this access 0 - MMT D 1 - HTTP 2- RTP 3-255 Reserved for future use | |

TABLE 4-continued

| Name | Description | Data Type |
|---|---|---|
| AccessURL | URL which the client can use to construct the URL to receive MMT Package or Asset | |
| SessionDescription | Information about Session Description for Unicast Network | |
| Hybrid Access info | Information of hybrid network It has the following Elements: Broadcast Unicast | |
| Broadcast | BroadcastNetwork Information and Package/Asset list | |
| Unicast | UnicastNetwork Information and Package/Asset List | |
| DCAS system | Information of Downloadable CAS system | |
| DCAS Type | Identifies D- CAS type Possible values: 0 - 255 To be defined | |
| DCASServer Address | Address of DCAS server where a client get certificated | |
| PrivateExt | An element serving as a container for proprietary or application-specific extensions | |
| <proprietary elements> | Proprietary or application-specific elements that are not defined in this specification These elements may further contain sub-elements or attributes. | |

The MAIT is a table providing information through which the MMT package and asset are obtainable. The MAIT provides information on the MAIT itself and access information on a network through which the MMT package and asset are provided. The information on the MAIT itself includes an identifier (ID) of the MAIT, a version of the MAIT, and transmission information on the MAIT (MAIT Transmission Info). The identifier of the MAIT may be a globally unique identifier, may be unique only within a range of a provider providing the MAIT, and may be unique only within a transmission network. That is, a range of the validity of the MAIT may be determined according to the purpose of the use of the MAIT. MAIT Transmission Info provides information necessary for delivering the MAIT, and has two sub elements of StartTime and Retransmission. StartTime provides an initial transmission time of the MAIT. Retransmission period notifies of a period with an interval of the transmission of the MAIT from the initial transmission time indicated by StartTime to notify of information on a time at which a device is scheduled to receive the MAIT. List of Packages or Assets notifies of the MMT packages and assets accessible through the MAIT. One MAIT may provide access information on one MMT package or asset, and may provide access information on a plurality of MMT packages or assets. In a case where one MAIT provides the access information on the plurality of MMT packages or assets, the MAIT may be used in order to prevent the MAIT from being duplicately provided when one service provider provides the plurality of MMT packages or assets.

AccessType provides information on a type for an access to the MMT package or asset suggested in List of Packages or Assets, and may include three types, BroadcastDelivery, UinicastDeliver, and HybridDelivery. BroadcastDelivery is a case where the MMT package or asset is delivered through the broadcast channel, and provides the type of network (Network Type) and SessionDescription which is information on a session that is a logic path through which the MMT package or asset is delivered as additional information. NetworkType notifies of a used network among broadcast dedicated networks (for example, Advanced Television System Committee (ATSC) that is the US terrestrial broadcasting standard, Digital Video Broadcasting (DVB) that is the European terrestrial broadcasting standard, and integrated Services Digital Broadcasting-Terrestrial (ISDB-T) that is the Japanese terrestrial broadcasting standard), and a version of the broadcast network. Further, even in a case where the MMT package or asset is delivered through a portable broadcast network (for example, DVB-NGH, ISDB T2, ATSC M/H, and CMMB), information on the type and a version of the portable broadcast network is provided. In addition to the broadcast network or the portable broadcast network, information on a satellite broadcast network or other broadcasting dedicated networks may be added. SessionDescription is used when information on the broadcast network, other than the physical layer, is provided. In a case of the IP-based broadcast network, the information may be provided by using the Session Description Protocol (SDP) method defined in the IETF, or information necessary for access to the MMT package or assets may be provided by a method defined in each broadcasting standard organization.

UnicastDelivery in AccessType provides the type of network through which access to the MMT package or asset is available. AccessURL provides an address of a server. SessionDescription is information on a session that is a logic path between the server and a client. A role of SessionDescription is the same as SessionDescription described in BroadcastDelivery. The server may recognize information on a protocol delivering the MMT package or asset through the type of UnicastDelivery. The protocol may include the protocol of MMT D.2 defined in the MMT standard, HTTP, RTP, FTP, or the like. Access URL provides an address of a server from which the MMT package or asset is obtainable through a unicast network.

Hybrid Access Info provides access information for a case where the MMT package or asset is delivered through a hybrid network environment. The hybrid network environment means an environment in which at least two heterogeneous networks are used for delivering the MMT package or asset. HybridAccessInfo has two sub elements of Broadcast and Unicast. Broadcast provides information on a broadcast network from among the hybrid networks and information on the MMT package or asset delivered through the broadcast network by using BroadcastDelivery. Unicast provides information on a unicast network among the hybrid networks and information on the MMT package or asset delivered through the unicast network by using the form of UnicastDelivery.

One of the pieces of information provided by the MAIT is related to a Downloadable Conditional Access System (DCAS). The DCAS refers to a CAS which is not mounted on a terminal, but is downloaded for use if necessary. The CAS is typically directly mounted on a terminal, but may be downloaded by an efficient method capable of supporting various CAS solutions. The DCAS solution itself does not belong to the scope of the present disclosure, so a detailed description thereof will be omitted. In the present disclosure, a method of providing information on the DCAS through the MAIT when the DCAS is used in the MMT system is described. DCAS has sub elements of DCAS Type and DCASServerAddress. DCAS Type notifies of the type of CAS solution, and DCAServerAddress notifies of an address of a server from which the CAS solution and necessary security materials are receivable. PrivateExt and <Proprietary Elements> are elements used when a business operator, an MMT asset producing company, or a producer producing the MAIT desires to provide predetermined information.

TABLE 5

| Name | Description | Data Type |
| --- | --- | --- |
| DCIT | Device Capability Information Table<br>Contains the following elements:<br>Video<br>Audio<br>DownloadFile<br>Rich Media | |
| id | ID of DCIT | |
| version | Version of DCIT | |
| DCIT Transmission info | DCIT transmission information having StartTime or Retransmission Period | |
| StartTime | Starting Time of DCIT Transmission | |
| Retransmission Period | Retransmission time of dcIT | |
| List of Package or Asset | List of Package or Asset that recommend the capabilities in DCIT | |
| Video | Video codec capability related requirements<br>Contains the following elements:<br>MIMEType, CODEC and Complexity<br>Complexity | |
| MIMEType | MIME Media type of the video<br>If the complexities that can be derived from the MIMEType element and the codec parameters below differ from the parameters defined under the 'Complexity' element below, then the parameters defined under the 'Complexity' element SHALL take priority.<br>Contains the following attribute:<br>codec | |
| codec | The codec parameters for the associated MIME Media type<br>If the MIME type definition specifies mandatory parameters, these MUST be included in this string. Optional parameters containing information that can be used to determine as to whether the terminal can make use of the media SHOULD be included in the string. | |
| Complexity | The complexity the video decoder has to deal with<br>It is RECOMMENDED that this element is included if the complexity indicated by the MIME type and codec parameters differs from the actual complexity.<br>Contains the following elements:<br>Bitrate<br>Resolution<br>MinimumBufferSize | |
| Bitrate | The total bit-rate of the video stream<br>Contains the following attributes:<br>average<br>maximum | |
| average | The average bit-rate in kbit/s | |
| maximum | The maximum bit-rate in kbit/s | |
| Resolution | The resolution of the video<br>Contains the following attributes:<br>horizontal<br>vertical<br>temporal | |
| horizontal | The horizontal resolution of the video in pixels | |
| vertical | The vertical resolution of the video in pixels | |
| temporal | The maximum temporal resolution in frames per second. | |
| MinimumBufferSize | The minimum decoder buffer size needed to process the video content in kbytes | |
| Audio | The audio codec capability<br>Contains the following elements:<br>MIMEType<br>Complexity | |
| MIMEType | MIME Media type of the audio<br>If the complexities that can be derived from the MIMEType element and the codec parameters below differ from the parameters defined under the 'Complexity' element below, then the parameters defined under the | |

TABLE 5-continued

| Name | Description | Data Type |
|---|---|---|
| | 'Complexity' element SHALL take priority.<br>Contains the following attribute:<br>codec | |
| codec | The codec parameters for the associated MIME Media type<br>If the MIME type definition specifies mandatory parameters, these MUST<br>be included in this string. Optional parameters containing information<br>that can be used to determine as to whether the terminal can make use<br>of the media SHOULD be included in the string. | |
| Complexity | The complexity the audio decoder has to deal with<br>It is RECOMMENDED that this element is included if the complexity<br>indicated by the MIME type and codec parameters differs from the actual<br>complexity.<br>Contains the following elements:<br>Bitrate<br>MinimumBufferSize | |
| Bitrate | The total bit-rate of the audio stream<br>Contains the following attributes:<br>average<br>maximum | |
| average | The average bit-rate in kbit/s | |
| maximum | The maximum bit-rate in kbit/s | |
| MinimumBufferSize | The minimum decoder buffer size needed to process the audio content in<br>kbytes | |
| DownloadFile | The required capability for the download files<br>Contains the following elements:<br>MIMEType | |
| MIMEType | Assuming a download service consists of a set of files with different<br>MIME types which together make up the service, the terminal must<br>support all of these MIME types in order to be able to present the<br>service to the user.<br>Contains the following attribute:<br>codec | |
| codec | The codec parameters for the associated MIME Media type<br>If the file's MIME type definition specifies mandatory parameters,<br>these MUST be included in this string. Optional parameters containing<br>information that can be used to determine as to whether the terminal<br>can make use of the file SHOULD be included in the string. | |
| RichMedia | Indicates which RichMedia solution is used and what the requirement is. | |
| PrivateExt | An element serving as a container for proprietary or application-<br>specific extensions | |
| <proprietary elements> | Proprietary or application-specific elements that are not defined in<br>this specification<br>These elements may further contain sub-elements or attributes. | |

The DCIT is a table providing device capability recommended for consuming the MMT package/asset. The DCIT provides information on the DCIT itself and information necessary for consuming the MMT package/asset. The information on the DCIT itself is an identifier (ID) of the DCIT, a version of the DCIT, and transmission information on the DCIT (DCIT Transmission Info). The identifier of the DCIT is an identifier of the DCIT and may be a globally unique identifier, may be unique only within a range of a provider providing the DCIT, or may be unique only within a transmission network. That is, the range of the validity of the DCIT may be determined according to the purpose of the use of the DCIT. DCIT Transmission Info provides information necessary for delivering the DCIT, and has two sub elements of StartTime and Retransmission. StartTime provides an initial transmission time of the DCIT. Retransmission period notifies of a period with an interval of the transmission of the DCIT from the initial transmission time indicated by StartTime to notify of information on a time at which a device is scheduled to receive the DCIT.

DCIT provides a specification of a device for consuming a video and an audio, a specification of a device for downloading a file, and a specification of a device for consuming rich media. The terminal may determine whether it is possible to consume the MMT package/asset conforming to the DCIT based on the information provided by the DCIT. List of Package or Asset provides an ID of the MMT package/asset demanded in the specification of the device provided by the DCIT, or the MACIT providing the configuration information of the MMT package/asset, and the ID of the MACIT.

The specification of the device for a video is basically provided by MIMEType. MIME is an abbreviation of Multipurpose Internet Mail Extensions [IETFRFC 822, 2822, 5322] and is a technology capable of providing an attribute for multimedia contents. Information provided by MIMEType includes a codec used in a video and profile information on the codec, but the information may be changed due to a change in a hardware or a restriction of the system at a time at which the information is actually provided to the user. The changed information is provided by an element of Complexity. Complexity has sub elements of Bitrate, Resolution, and MinumimBufferSize. Bitrate is information on a bit rate of a video stream, and provides an average bit rate and a maximum bit rate to achieve a smooth operation of a decoder (especially, a memory-related operation). Resolution provides horizontal resolution and vertical resolution of a video with pixels, and provides information on temporal resolution regarding the number of reproduced frames per second. MinimumBufferSize means a minimum size of a decoder buffer required for handling the video contents. The specification of the device for an audio is basically provided by MIMEType. That is, information on the specification of the device for the audio provided by MIMEType includes a codec used in an audio and profile information on the codec, but the information may be changed due to a change in a hardware or a restriction of the system at a time at which the information is actually provided to the user. The changed information is provided by an element of Complexity. Complexity has sub elements of Bitrate and MinimumBufferSize. Bitrate is information on a bit rate of an audio stream, and provides an average bit rate and a maximum bit rate to achieve a smooth operation of a decoder (especially, a memory-related operation). MinimumBufferSize means a minimum size of the decoder buffer necessary for handling the audio contents. DownloadFile provides a specification of a device demanded for the asset and the package according to a file type. Typically, in a service of the file types, multiple multimedia contents are complex. The composition information may be provided by MIMEType, and necessary codec information may be separately provided. RichMedia is a field providing the specification of the device for consuming the rich media contents. The rich media contents provides a new service experience to the user through an interaction with the user, and a representative technology thereof is LaSER of the MPEG, BIMS of the 3GPP, and SVG-T of the W3C, and in addition, includes FLASH of the Adobe company as a non-standard technology. The field of RichMedia provides a producing technology of the rich media contents and requirements, and may employ the MIME technology. PrivateExt and <Proprietary Elements> are elements used when a business operator or an MMT package producing company, or a producer producing the DCIT desires to provide predetermined information.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for receiving multimedia content in a broadcast system, the method comprising:
receiving a packet according to a moving picture experts group (MPEG) media transport (MMT) protocol, the packet including a packet header and a packet payload, wherein the packet payload comprises a control message for a package of the multimedia content; and
processing the multimedia content based on the control message,
wherein the control message comprises:
a message type field including information on a type of the control message,
a length field including information on a length of the control message,
an extensive information field including identifier information indicating an identifier of a first table in a payload field of the control message and version information indicating a version of the first table, and
the payload field including the first table,
wherein the first table provides information on a second table, and the first table comprises first location information providing a first location of the second table, the identifier information indicating the identifier of the first table and the version information indicating the version of the first table, and
wherein the second table provides information for consuming the package, and the second table comprises a list of assets related to the package.

2. The method of claim 1, wherein the first table further comprises identifier information of the second table and version information of the second table.

3. The method of claim 1, wherein the first location information comprises an Internet Protocol (IP) address and an IP port.

4. The method of claim 1, wherein the first table further comprises second location information providing a second location of the second table which is an alternative to the first location.

5. The method of claim 1, wherein the second table further comprises identifier information of the second table and version information of the second table.

6. The method of claim 1, wherein the second table further comprises third location information for providing location information of assets of the list of assets.

7. A method for providing multimedia content in a broadcast system, the method comprising:
generating a packet according to a moving picture experts group (MPEG) media transport (MMT) protocol, the packet including a packet header and a packet payload, wherein the packet payload comprises a control message for a package of the multimedia content; and
transmitting the generated packet to a receiving entity,
wherein the control message comprises:
a message type field including information on a type of the control message,
a length field including information on a length of the control message,
an extensive information field including identifier information indicating an identifier of a first table in a payload field of the control message and version information indicating a version of the first table, and
the payload field including the first table,
wherein the first table provides information on a second table, and the first table comprises first location information providing a first location of the second table, the identifier information indicating the identifier of the first table and the version information indicating the version of the first table, and wherein the second table provides information for consuming the package, and the second table comprises a list of assets related to the package.

8. The method of claim 7, wherein the first table further comprises identifier information of the second table and version information of the second table.

9. The method of claim 7, wherein the first location information comprises an Internet Protocol (IP) address and an IP port.

10. The method of claim 7, wherein the first table further comprises second location information providing a second location of the second table which is an alternative to the first location.

11. The method of claim 7, wherein the second table further comprises identifier information of the second table and version information of the second table.

12. The method of claim 7, wherein the second table further comprises third location information for providing location information of assets of the list of assets.

* * * * *